United States Patent
Che et al.

(10) Patent No.: US 10,198,261 B2
(45) Date of Patent: Feb. 5, 2019

(54) FLEXIBLE FRAMEWORK TO SUPPORT MEMORY SYNCHRONIZATION OPERATIONS

(71) Applicant: Advanced Micro Devices, Inc., Sunnyvale, CA (US)

(72) Inventors: Shuai Che, Bellevue, WA (US); Marc S. Orr, Bellevue, WA (US); Bradford M. Beckmann, Bellevue, WA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 162 days.

(21) Appl. No.: 15/096,205

(22) Filed: Apr. 11, 2016

(65) Prior Publication Data

US 2017/0293487 A1 Oct. 12, 2017

(51) Int. Cl.
*G06F 9/30* (2018.01)
*G06F 12/10* (2016.01)
*G06F 12/0802* (2016.01)
*G06F 12/0811* (2016.01)
*G06F 12/0815* (2016.01)
*G06F 12/0837* (2016.01)
(Continued)

(52) U.S. Cl.
CPC ...... *G06F 9/30087* (2013.01); *G06F 12/0811* (2013.01); *G06F 12/0815* (2013.01); *G06F 12/0837* (2013.01); *G06F 12/0802* (2013.01); *G06F 12/0875* (2013.01); *G06F 12/0897* (2013.01); *G06F 12/10* (2013.01); *G06F 2212/1016* (2013.01); *G06F 2212/452* (2013.01)

(58) Field of Classification Search
CPC ............. G06F 9/30087; G06F 12/0802; G06F 12/0815; G06F 12/0875; G06F 12/0897; G06F 12/10; G06F 2212/452; G06F 12/0811; G06F 12/0837; G06F 2212/1016
USPC .................................. 711/122, 119, 141, 146
See application file for complete search history.

(56) References Cited

U.S. PATENT DOCUMENTS

| 2009/0055596 A1* | 2/2009 | Wallach | G06F 9/3879 711/141 |
| 2017/0061569 A1* | 3/2017 | Sathe | G06T 1/20 |
| 2017/0286118 A1* | 10/2017 | Coleman | G06F 9/3802 |

OTHER PUBLICATIONS

Khronos Group, "The open standard for parallel programming of heterogeneous systems", available at: https://www.khronos.org/opencl/, 2016 (Retrieved Apr. 10, 2016).
(Continued)

*Primary Examiner* — Shane D Woolwine
(74) *Attorney, Agent, or Firm* — Volpe and Koenig, P.C.

(57) ABSTRACT

A method of performing memory synchronization operations is provided that includes receiving, at a programmable cache controller in communication with one or more caches, an instruction in a first language to perform a memory synchronization operation of synchronizing a plurality of instruction sequences executing on a processor, mapping the received instruction in the first language to one or more selected cache operations in a second language executable by the cache controller and executing the one or more cache operations to perform the memory synchronization operation. The method further comprises receiving a second mapping that provides mapping instructions to map the received instruction to one or more other cache operations, mapping the received instruction to one or more other cache operations and executing the one or more other cache operations to perform the memory synchronization operation.

20 Claims, 4 Drawing Sheets

(51) Int. Cl.
*G06F 12/0875* (2016.01)
*G06F 12/0897* (2016.01)

(56) References Cited

OTHER PUBLICATIONS

HSA Foundation, "Heterogenous System Architecture (HSA) Foundation", available at: http://www.hsafoundation.com/, 2016 (Retrieved Apr. 10, 2016).

Orr, Marc S., et al., "Synchronization Using Remote-Scope Promotion", Proceedings of the Twentieth International Conference on Architectural Support for Programming Languages and Operating Systems (ASPLOS '15), Istanbul, Turkey, Mar. 14-18, 2015, pp. 73-86, ACM, New York, NY, U.S.A.

Hechtman, Blake A., et al, "QuickRelease: A Throughput-oriented Approach to Release Consistency on GPUs", HPCA, 2014 IEEE 20th International Symposium on High Performance Computer Architecture (HPCA), Feb. 14-19, 2014, pp. 189-200, doi:10.1109/HPCA.2014.6835930, IEEE, Orlando, FL, U.S.A.

\* cited by examiner

FLEXIBLE FRAMEWORK TO SUPPORT MEMORY SYNCHRONIZATION OPERATIONS

TECHNICAL FIELD

The disclosure is generally directed to performing memory synchronization operations and in particular, to using a programmable cache controller to map received high level instructions to executable cache operations that perform the memory synchronization operations.

BACKGROUND

Instructions of a program to execute memory operations, such as (e.g., load and store) as well as a sequence of instructions (e.g., threads and work items) of the program are typically not executed in their specified order. Some operations, such as memory fence operations (e.g., load-acquire and store-release), atomic operations appearing to occur instantaneously (e.g., complete in a single step relative to other threads) and locks are used to synchronize the memory operations in multi-threaded environments (e.g., environments using a graphics processing unit (GPUs) to process many tasks in parallel) or when interfacing with other hardware (e.g., via memory buses).

For example, memory fence operations or barriers provide an ordering constraint on the memory operations issued before and after an instruction so that stores issued prior to the fence are visible before loads issued after the fence. The efficiency of memory synchronization operations depends on a wide variety of criteria.

BRIEF DESCRIPTION OF THE DRAWINGS

A more detailed understanding may be had from the following description, given by way of example in conjunction with the accompanying drawings wherein.

DETAILED DESCRIPTION

Figure 1:
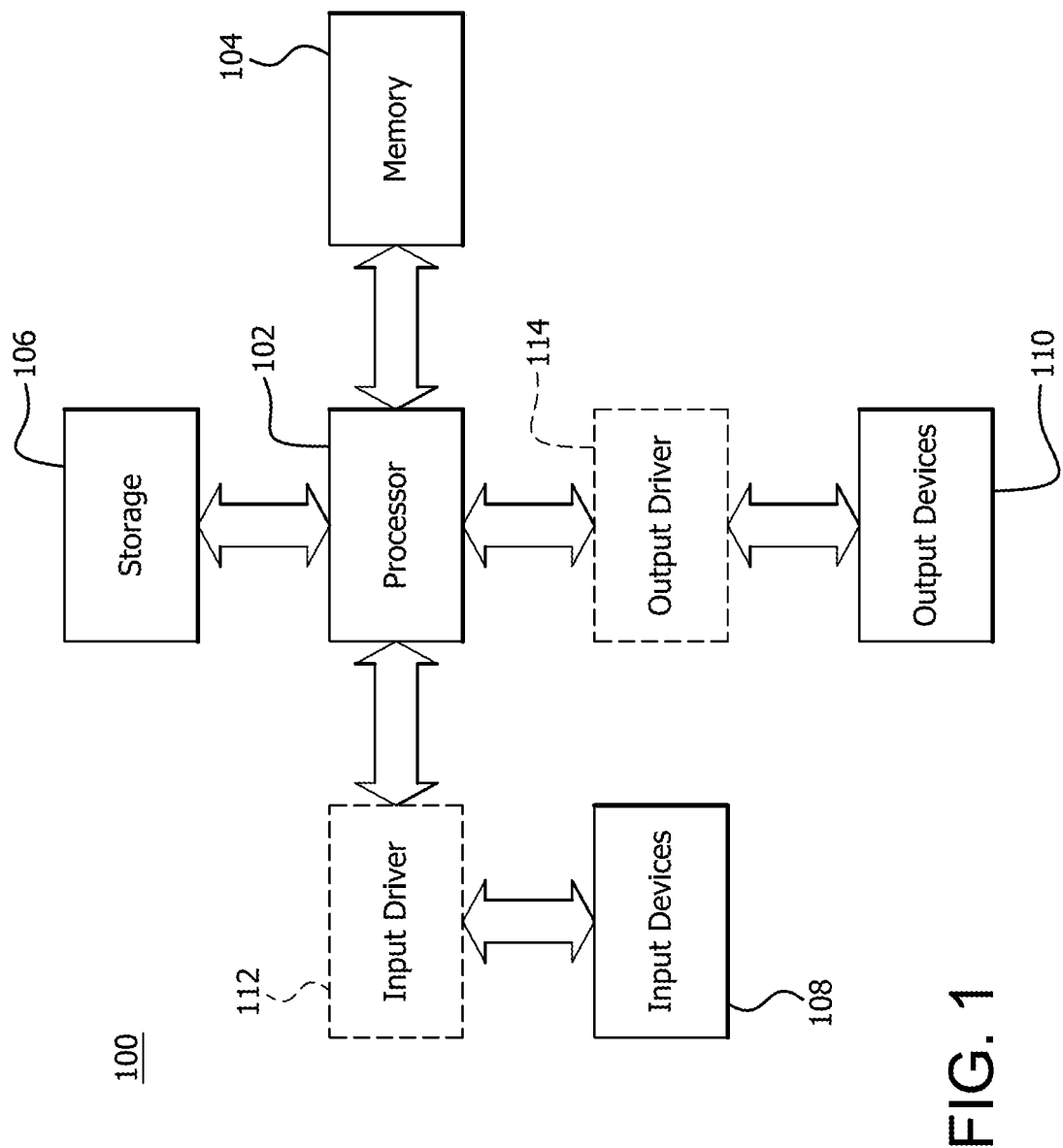
FIG. 1 is a block diagram of an example device in which memory synchronization operations described herein may be implemented.

A method of performing memory synchronization operations is provided which includes receiving, at a cache controller in communication with one or more caches, an instruction in a first language to perform a memory synchronization operation of synchronizing a plurality of instruction sequences executing on a processor, mapping, by the cache controller, the received instruction in the first language to one or more cache operations in a second language executable by the cache controller and executing, by the cache controller, the one or more cache operations to perform the memory synchronization operation of synchronizing the plurality of instruction sequences executing on the processor.

The method may further include receiving, at the cache controller, a second mapping providing mapping instructions to map the received instruction to one or more other cache operations selected from a plurality of selectable cache operations in the second language, mapping, by the cache controller, the received instruction to one or more other cache operations in the second language executable by the cache controller and executing, by the cache controller, the one or more other cache operations to perform the memory synchronization operation of synchronizing the plurality of instruction sequences executing on the processor.

Each of the one or more cache operations may include processing data in the one or more caches.

Each of the one or more cache operations may be a sequence of cache operations each comprising processing data in the one or more caches.

The cache controller may be in communication with a lower cache level and a higher cache level.

The cache controller may be a second level cache controller in communication with: (i) a plurality of first level cache controllers each configured to control a first cache of one of a plurality of processor cores; and (ii) one or more second level caches each shared by two or more of a plurality of processor cores.

The method may also include synchronizing the plurality of instruction sequences executing on a GPU.

The first language may be a machine instruction set architecture (ISA) language and the second language may be a set of specific machine instructions executable by the cache controller to control the one or more caches.

The machine ISA language may be compiled from an intermediate language (IL) and the instruction to perform the memory synchronization operation may be a high-level instruction that is maintained when the machine ISA language is compiled from the IL.

A processing apparatus is provided that includes at least one processor and one or more cache controllers in communication with one or more caches. The one or more cache controllers are configured to receive an instruction in a first language to perform a memory synchronization operation of synchronizing a plurality of instruction sequences executing on the at least one processor, map the received instruction to one or more cache operations in a second language executable by the cache controller and execute the one or more cache operations to perform the memory synchronization operation of synchronizing the plurality of instruction sequences.

Each of the one or more cache controllers may be a programmable cache controller configured to receive mapping instructions to map the received instruction to one or more other cache operations from a plurality of selectable cache operations in the second language and the one or more cache controllers may be further configured to map the received instruction to one or more other cache operations in the second language executable by the cache controller and execute the one or more other cache operations to perform the memory synchronization operation of synchronizing the plurality of instruction sequences.

Each of the one or more cache operations may include processing data in the one or more caches.

Each of the one or more cache operations may be a sequence of cache operations each including processing data in the one or more caches.

Each of the one or more cache controllers may be in communication with a lower cache level and a higher cache level.

Each of the one or more cache controllers may be a second level cache controller in communication with: (i) a plurality of first level cache controllers each configured to control a first cache of one of a plurality of processor cores; and (ii) one or more second level caches each shared by two or more of a plurality of the processor cores.

The first language may be a machine ISA language and the second language is a set of specific machine instructions executable by the cache controller to control the one or more caches.

A tangible, non-transitory computer readable medium is provided that includes instructions for causing a computer to execute a method of performing memory synchronization operations. The instructions may include receiving, at a cache controller in communication with one or more caches, an instruction in a first language to perform a memory synchronization operation of synchronizing a plurality of instruction sequences executing on a processor, mapping, by the cache controller, the received instruction to one or more cache operations in a second language executable by the cache controller and executing, by the cache controller, the one or more cache operations to perform the memory synchronization operation of synchronizing the plurality of instruction sequences executing on the processor.

The instructions may further include receiving, at the cache controller, a second mapping providing mapping instructions to map the received instruction to one or more other cache operations selected from a plurality of selectable cache operations in the second language, mapping, by the cache controller, the received instruction to one or more other cache operations in the second language executable by the cache controller and executing, by the cache controller, the one or more other cache operations to perform the memory synchronization operation of synchronizing the plurality of instruction sequences executing on the processor.

Each of the one or more cache operations may be a sequence of cache operations each comprising processing data in the one or more caches.

The cache controller may be in communication with a lower cache level and a higher cache level.

As disclosed herein, a program may include any sequence of instructions executed on a processor (e.g., CPU, GPU) to perform any one of a variety of tasks, such as operations, computations, functions, processes and jobs. A sequence of instructions may, for example, include one or more threads, work-items, and work-groups (e.g., wavefronts). These terms are not exhaustive. Other terms may be used to describe different sequences of programmed instructions.

As disclosed herein, a memory synchronization operation is any operation used to synchronize sequences of programmed instructions executing on a processor. Memory synchronization operations may include, for example, memory fence operations, atomic operations, locks (and other high-level programming constructs built on top of memory fences) and arbitrary memory operations which may be used to synchronize sequences of programmed instructions.

Conventional implementation of each high level memory synchronization operation (e.g., load-acquire) is fixed in hardware given a particular limited memory and coherence model. For example, a high level memory synchronization operation of an IL program is transformed by a compiler to a more basic hardware operation in a machine ISA language to be executed by the hardware device.

The present disclosure provides a programmable and configurable cache controller that executes mapping instructions to map any number of received high level instructions to one or more other cache operations from a plurality of selectable basic operations. The mapping instructions may be changed (e.g., re-programmed) to change the mapping of any number of received high level instructions to one or more other cache operations from a plurality of selectable basic operations. In this manner, a cache controller may be programmed and configured to execute different cache operations based on a variety of factors.

The present disclosure utilizes a set of memory ordering models (e.g., release consistency, sequential consistency, and relaxed) to implement a variety of high-level synchronization operations (e.g., memory fence operations and atomic operations). For simplification of explanation, a release consistency operation executing on a GPU is used herein to describe implementation of high-level synchronization operations. The implementation of high-level synchronization operations is applicable, however, to a variety of processor architectures and memory models.

FIG. 1 is a block diagram of an example device 100 in which memory synchronization operations described herein may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
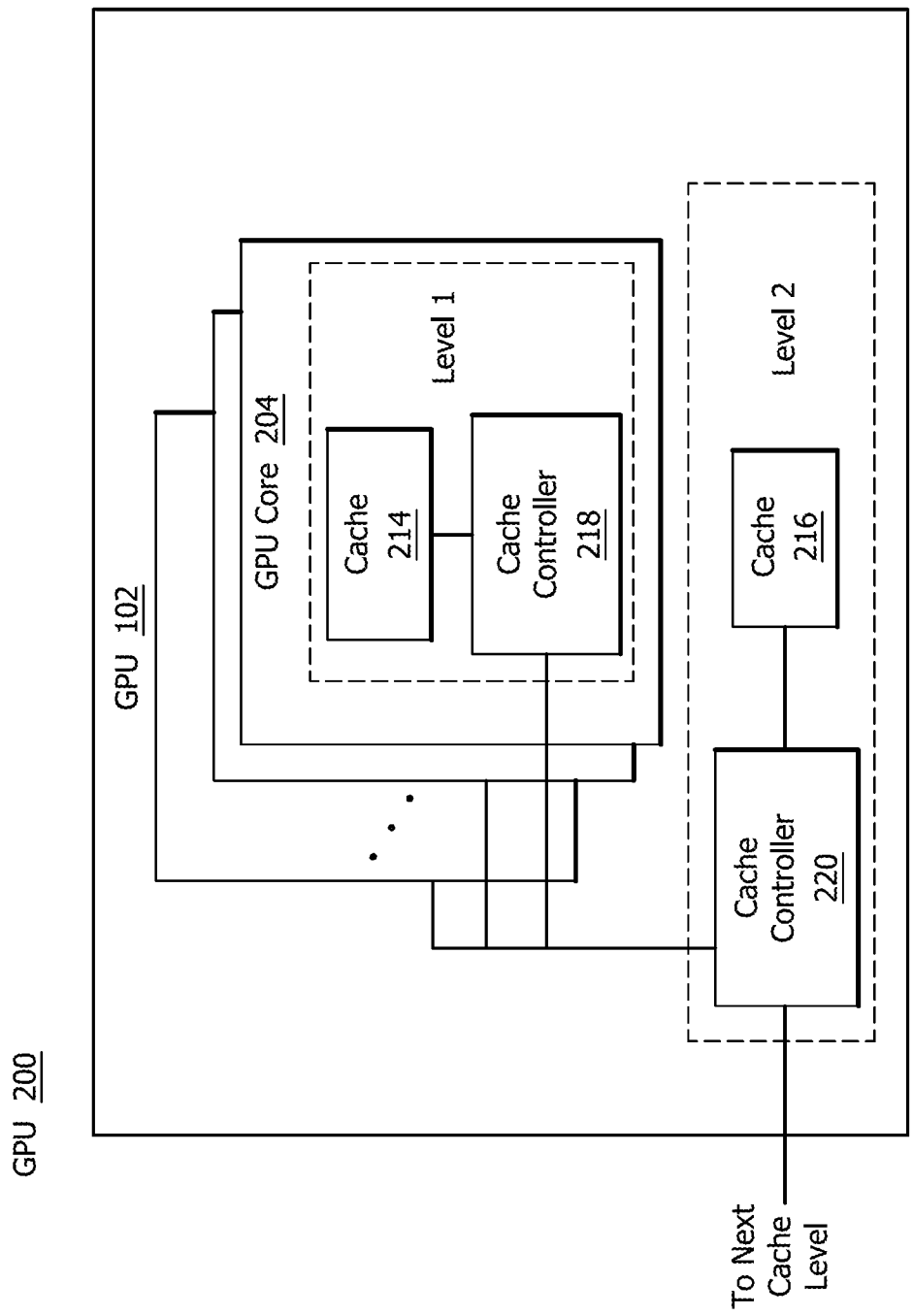
FIG. 2 is a block diagram of the exemplary processor shown in FIG. 1.

FIG. 2 is a block diagram 200 of the exemplary processor 102 shown in FIG. 1. For simplification of explanation, the processor 102 shown in FIG. 2 is a GPU. Synchronization operations may be executed on any number of processors, however, and on different types of processors. For example, synchronization operations may be executed by one or more processors of a first type, such as a CPU, and/or one or more processors of a second type, such as a GPU.

Synchronization operations may be performed by programmable cache controllers on any number of a plurality of levels. For example, as shown in FIG. 2, GPU 102 may include a plurality of GPU cores 204. Each GPU core 204 may include a corresponding level 1 cache controller 218 in communication with a corresponding level 1 cache 214 and configured to process data (as described in more detail below) using the corresponding level 1 cache 214.

As further shown in FIG. 2, GPU 102 may also include a level 2 cache controller 220 in communication with level 2 cache 216 and configured to process data (as described in more detail below) using level 2 cache 216. GPU 102 may include any number of level 2 cache controllers in communication with any number of corresponding level 2 caches. Cache controller 220 may also be in communication with a next cache level (higher cache level), as indicated in FIG. 2. For example, the next cache level may include a level 3 cache controller (not shown) in communication with any number of corresponding level 3 caches. A level 3 cache may be shared by caches of multiple processors, such as for example, caches of a CPU (not shown) and GPU 102, which may be located on the same die, or multiple dies. One or more cache controllers (e.g., cache controller 220) may be in communication with one or more caches (e.g., level 1 caches, level 2 caches, etc.).

Each processor may include a processor memory. For example, cache 216 may be in communication with a GPU memory (not shown), which may be shared by any number of the GPU cores 204. Cache 216 may also be in communication with a global memory 216 (not shown) which may be visible and used by GPU 204 and one or more other processors.

Figure 3:
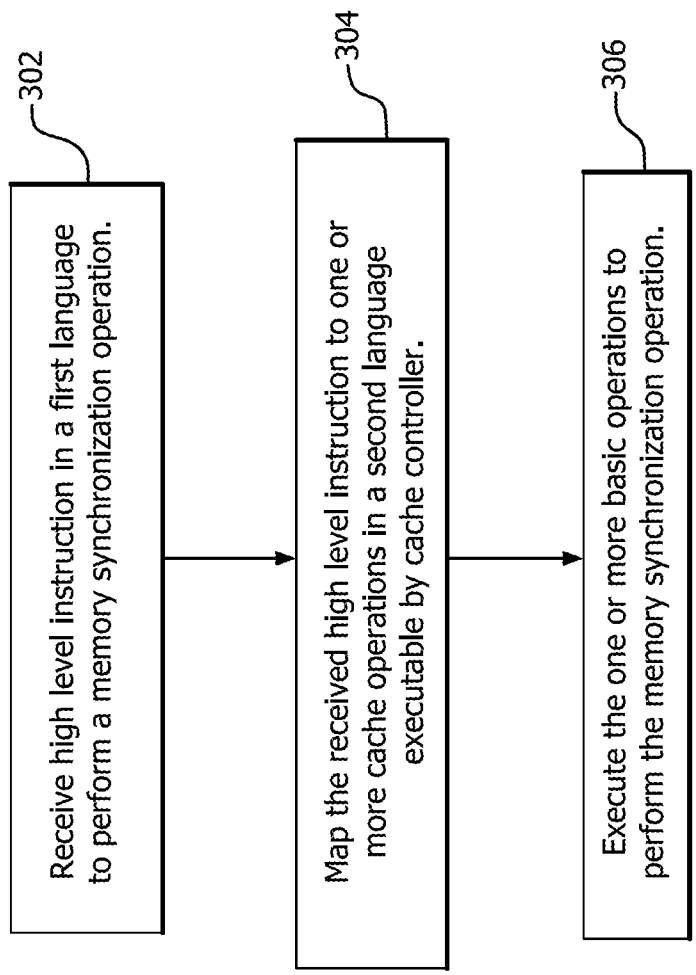
FIG. 3 is a flow diagram illustrating an exemplary method of performing memory synchronization operations.

FIG. 3 is a flow diagram illustrating an exemplary method 300 of performing memory synchronization operations. As shown at block 302, the method may include receiving an instruction in a first language to perform a memory synchronization operation of synchronizing a plurality of instruction sequences executing on a processor. For example, a cache controller in communication with one or more caches may receive the instruction in a first language to perform a memory synchronization operation.

The instruction may, for example, be an instruction as part of a kernel program to perform any high level memory synchronization operation, such as memory fence operations (e.g., load-acquire, store-release), atomic operations, locks and arbitrary memory operations which may be used to synchronize sequences of programmed instructions. A high level memory synchronization operation may be an operation in a machine ISA program compiled from a programming language or from an intermediate language IL (e.g., Heterogeneous System Architecture Intermediate (HSAIL)). For example, a high-level compiler may compile a program, such as a program intended to be executed on a GPU, to a format stored in an IL which is further compiled to machine ISA including high-level memory synchronization operations.

In contrast to conventional methods, however, when the IL program is compiled to a machine ISA language executable by the cache controller, the high-level instructions to perform the memory synchronization operations are maintained. Further, because the cache controller is programmable, the cache controller may be configured and reconfigured such that during program execution, the cache controller receives the high level instructions and maps the high level instruction to smaller basic operations or a sequence of smaller basic operations.

As shown at block 304, the received instruction operation in the machine ISA program may be mapped, by the cache controller, to one or more cache operations in a second language executable by the cache controller. The second language may be specific instructions that define basic operations to be executable by the cache controller. The high level instructions to perform the memory synchronization operation may be transformed by a cache controller to one or more basic hardware operations, such as cache operations. The mapping between the ISA language and basic cache operations can be reconfigured by programmers, compilers or system software and the operations are executed by the cache controller.

For example, high level instructions may be mapped to one or more of the following basic cache operations or sequences of operations:

Invalidate line
Lazily invalidate any lines touched by thread X
Invalidate individual cache
Invalidate cache level
Invalidate all caches
. . .
Flush dirty line
Flush dirty lines written by thread X
Flush all dirty lines in particular cache
Flush all dirty lines at a particular cache level
Flush all dirty lines in all caches
. . .
Promote the scope of the last release to the scope of this acquire
Promote the scope of the next release to the scope of this acquire
. . .

Using release consistency as an example, for a high level instruction to perform a load-acquire operation, a cache controller may map the instruction to invalidate one or more level 1 caches. Load-acquire semantics may also be implemented using a simple load instruction, such as for example when each prior coherent store performed precise invalidations. Similarly, for a store-release instruction, a cache controller may map the instruction to flush dirty data (e.g., data modified within a cache but not modified in a local or global memory) of one or more caches, such as level 1 caches and level 2 caches. The cache controller may map an instruction to a cache including a FIFO structure tracking all the previous stores.

The cache controller may also map remote scope instructions. For example, the cache controller may map remote-acquire and remote-release instructions to a sequence of more basic promotion operations,(e.g., invalidate data and/or flush data at a particular level 1 cache or a subset of level 1 caches).

As shown at block 306, the cache controller may execute the one or more cache operations to perform the memory synchronization operation of synchronizing the plurality of instruction sequences executing on the processor.

Figure 4:
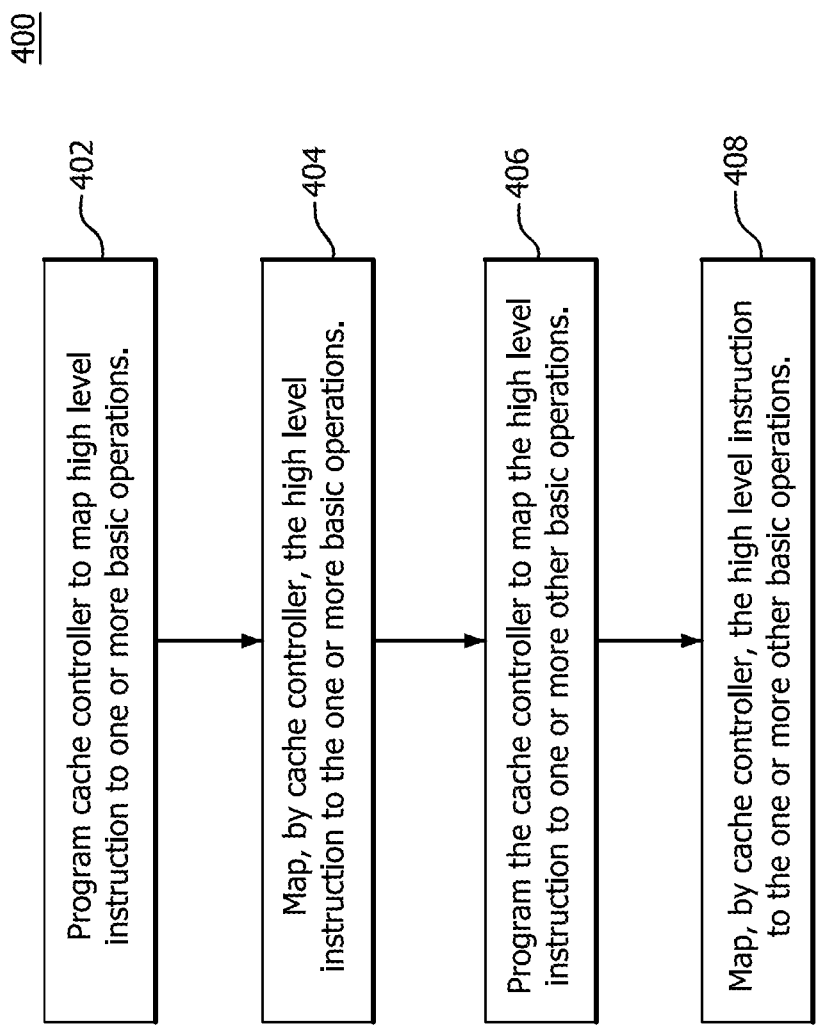
FIG. 4 is a flow diagram illustrating an exemplary method of using a programmable cache controller to perform memory synchronization operations.

FIG. 4 is a flow diagram illustrating an exemplary method 400 of using a programmable cache controller to perform memory synchronization operations. Because the cache controller is programmable and reconfigurable, the cache controller may receive mapping instructions to change the mapping of any number of received high level instructions to one or more other cache operations from a plurality of selectable basic operations, such as the selectable basic operations described above. For example, as shown at block 402, the cache controller may be programmed based on a first memory model to receive mapping instructions to receive an instruction to perform the memory synchronization operation and map the instruction to one or more basic operations executable by the cache controller to perform the memory synchronization operations.

As shown at block 404, the cache controller may map the received high level instruction (e.g., load-acquire or store release) to one or more basic operations from a plurality of selectable basic operations, such as the basic cache operations described above.

The cache controller may then be re-programmed based on, for example, a second memory model different from the first memory model. For example, as shown at block 406, the cache controller may be programmed to receive mapping instructions to receive an instruction to perform the memory synchronization operation and map the instruction to one or more other basic operations executable by the cache controller to perform the memory synchronization operations.

As shown at block 408, the cache controller may map the received high level instruction to the one or more other basic operations from the plurality of selectable basic operations, such as the basic cache operations described above.

The cache controller may include a program having mapping instructions to map any number of received high level instructions to one or more corresponding basic operations executable by the cache controller. The cache controller may be reprogrammed to change the mapping of each of the received high level instructions to the one or more corresponding basic operations executable by the cache controller. The cache controller may also be reprogrammed to change the mapping of one or more of the received high level instructions to one or more corresponding basic operations executable by the cache controller while maintaining the mapping of one or more of the received instructions to the one or more basic operations.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements methods of performing memory synchronization operations.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of performing memory synchronization operations comprising:
    receiving, at a cache controller configured to control the execution of a plurality of cache operations for one or more caches, an instruction, at a first time, in a first language to perform a memory synchronization operation of synchronizing a plurality of instruction sequences executing on a processor;
    selecting for execution, by the cache controller, one or more of the plurality of cache operations by mapping the instruction, received at the first time, in the first language to the one or more cache operations in a second language executable by the cache controller;
    executing, by the cache controller, the selected one or more cache operations to perform the memory synchronization operation of synchronizing the plurality of instruction sequences executing on the processor;
    receiving, at the cache controller, the instruction at a second time after the first time; and
    changing the mapping of the instruction, received at the second time, to one or more other cache operations in the second language executable by the cache controller.

2. The method of claim 1, further comprising:
    receiving, at the cache controller, a mapping instruction to change the mapping of the received instruction to the one or more other cache operations,
    changing, by the cache controller, the mapping of the received instruction by selecting, for execution, the one or more other cache operations; and
    executing, by the cache controller, the one or more other operations to perform the memory synchronization operation of synchronizing the plurality of instruction sequences executing on the processor.

3. The method of claim 1, wherein each of the one or more cache operations comprises processing data in the one or more caches.

4. The method of claim 1, wherein each of the one or more cache operations is a sequence of cache operations each comprising processing data in the one or more caches.

5. The method of claim 3, wherein the cache controller is in communication with a lower cache level and a higher cache level.

6. The method of claim 3, wherein the cache controller is a second level cache controller in communication with: (i) a plurality of first level cache controllers each configured to control a first cache of one of a plurality of processor cores; and (ii) one or more second level caches each shared by two or more of a plurality of processor cores.

7. The method of claim 1, further comprising synchronizing the plurality of instruction sequences executing on a graphics processing unit (GPU).

8. The method of claim 1, wherein the first language is a machine instruction set architecture (ISA) language and the second language is a set of specific machine instructions executable by the cache controller to control the one or more caches.

9. The method of claim 8, wherein the machine ISA language is compiled from an intermediate language (IL) and the instruction to perform the memory synchronization operation is a high-level instruction that is maintained when the machine ISA language is compiled from the IL.

10. A processing apparatus comprising:
at least one processor;
a cache controller configured to control the execution of a plurality of cache operations for one or more caches, the cache controller configured to:
receive an instruction, at a first time, in a first language to perform a memory synchronization operation of synchronizing a plurality of instruction sequences executing on the at least one processor;
select, for execution, one or more of the plurality of cache operations by mapping the instruction, received at the first time, to the one or more cache operations in a second language executable by the cache controller;
execute the selected one or more cache operations to perform the memory synchronization operation of synchronizing the plurality of instruction sequences;
receive, at the cache controller, the instruction at a second time after the first time; and
change the mapping of the instruction, received at the second time, to one or more other cache operations in the second language executable by the cache controller.

11. The processing apparatus of claim 10, wherein the cache controller is a programmable cache controller configured to:
receive a mapping instruction to change the mapping of the received instruction to the one or more other cache operations;
change the mapping of the received instruction by selecting the one or more other cache operations in the second language executable by the cache controller; and
execute the one or more other cache operations to perform the memory synchronization operation of synchronizing the plurality of instruction sequences.

12. The processing apparatus of claim 10, wherein each of the one or more cache operations comprises processing data in the one or more caches.

13. The processing apparatus of claim 10, wherein each of the one or more cache operations is a sequence of cache operations each comprising processing data in the one or more caches.

14. The processing apparatus of claim 12, wherein each of the one or more cache controllers is in communication with a lower cache level and a higher cache level.

15. The processing apparatus of claim 12, wherein each of the one or more cache controllers is a second level cache controller in communication with: (i) a plurality of first level cache controllers each configured to control a first cache of one of a plurality of processor cores; and (ii) one or more second level caches each shared by two or more of a plurality of the processor cores.

16. The processing apparatus of claim 10, wherein the first language is a machine instruction set architecture (ISA) language and the second language is a set of specific machine instructions executable by the cache controller to control the one or more caches.

17. A tangible, non-transitory computer readable medium comprising instructions for causing a computer to execute a method of performing memory synchronization operations, the instructions comprising:
receiving, at a cache controller configured to control the execution of a plurality of cache operations for one or more caches, an instruction, at a first time, in a first language to perform a memory synchronization operation of synchronizing a plurality of instruction sequences executing on a processor;
selecting for execution, by the cache controller, one or more of the plurality of cache operations by mapping the instruction, received at the first time, in the first language to the one or more cache operations in a second language executable by the cache controller;
executing, by the cache controller, the selected one or more cache operations to perform the memory synchronization operation of synchronizing the plurality of instruction sequences executing on the processor;
receiving, at the cache controller, the instruction at a second time after the first time; and
changing the mapping of the instruction, received at the second time, to one or more other cache operations in the second language executable by the cache controller.

18. The computer readable medium of claim 17, the instructions further comprising:
receiving, at the cache controller, a mapping instruction to change the mapping of the received instruction to the one or more other cache operations,
changing, by the cache controller, the mapping of the received instruction by selecting, for execution, the one or more other cache operations; and
executing, by the cache controller, the one or more other operations to perform the memory synchronization operation of synchronizing the plurality of instruction sequences executing on the processor.

19. The computer readable medium of claim 17, wherein each of the one or more cache operations is a sequence of cache operations each comprising processing data in the one or more caches.

20. The computer readable medium of claim 17, wherein the cache controller is in communication with a lower cache level and a higher cache level.

* * * * *